Figure 1:
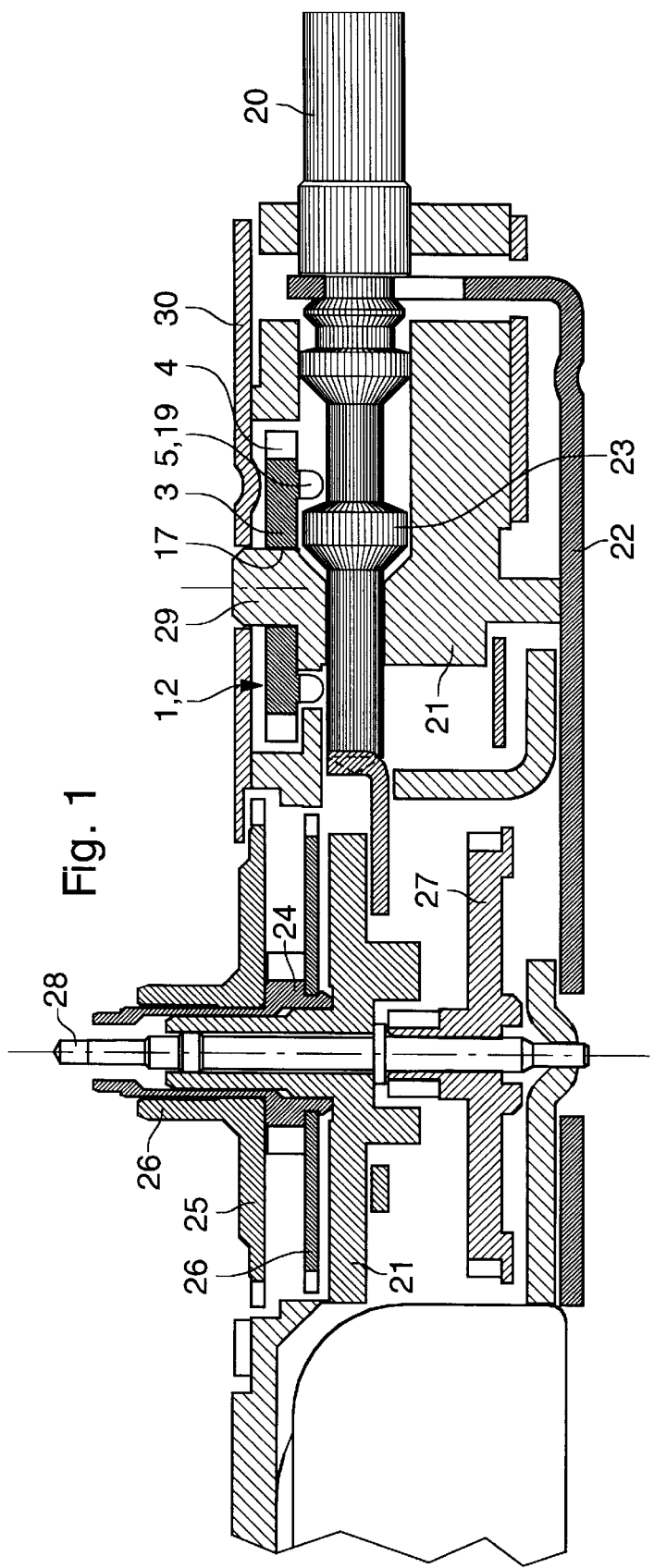

United States Patent

Bettelini

[11] Patent Number: 6,082,001
[45] Date of Patent: Jul. 4, 2000

[54] METHOD FOR MANUFACTURING A CLOCKWORK WHEEL

[75] Inventor: Marco Bettelini, Prêles, Switzerland

[73] Assignee: Eta SA Fabriques d'Ebauches, Grenchen, Switzerland

[21] Appl. No.: 09/418,554

[22] Filed: Oct. 14, 1999

[30] Foreign Application Priority Data

Oct. 15, 1998 [EP] European Pat. Off. ............. 98119480

[51] Int. Cl.[7] .................................................. B21D 53/28
[52] U.S. Cl. ................................. 29/893.33; 29/893.34; 29/896.3; 29/896.31; 72/335; 74/460; 74/462; 368/324
[58] Field of Search ............................. 29/896.3, 896.31, 29/893.33, 893.34; 72/335, 404; 74/460, 462; 368/322–324

[56] References Cited

U.S. PATENT DOCUMENTS

| 364,107 | 5/1887 | Hart | 29/893.34 |
|---|---|---|---|
| 4,958,430 | 9/1990 | Grieb et al. | 72/335 |
| 5,515,607 | 5/1996 | Ikegami | 29/893.34 |
| 5,647,125 | 7/1997 | Yokoyama | 29/893.34 |

FOREIGN PATENT DOCUMENTS

| 602233 | 3/1926 | France | 74/415 |
|---|---|---|---|
| 6-79382 | 3/1994 | Japan | 29/893.34 |
| 677 168 | 4/1991 | Switzerland . | |

OTHER PUBLICATIONS

Patent Abstracts of Japan, vol. 10, No. 18 (M–503) Jul. 30, 1986 & JP 61 055472, Mar. 19, 1986.

*Primary Examiner*—P. W. Echols
*Attorney, Agent, or Firm*—Sughrue, Mion, Zinn, Macpeak & Seas, PLLC

[57] ABSTRACT

A clockwork wheel (1) including a plate (3) provided with a first series of peripheral teeth (4) and a second series of teeth (5) arranged at right angles to the plate is manufactured in a strip of steel suitable for stamping and by means of a progressive forging die. In order to form the second series of teeth (5), a die perforated with a plurality of openings arranged in a circle is applied onto one face of the strip, and the flat face of a cylinder is pressed onto the other face of the strip to cause the steel to flow inside the openings of the die. The clockwork wheel is used as a setting wheel in a time or date setting mechanism.

6 Claims, 6 Drawing Sheets

METHOD FOR MANUFACTURING A CLOCKWORK WHEEL

The present invention concerns a method for manufacturing a clockwork wheel including a plate provided with a first series of teeth on the periphery thereof and a second series of teeth arranged at right angles to the plate. This invention also concerns a clockwork wheel manufactured according to this method.

The manufacture of a clockwork wheel via the cold flow of a steel suitable for stamping has already been proposed. Thus, with the object of optimising the manufacture and use of clockwork wheels, the document CH-B-677 168 proposes a wheel including a wheel on which a pinion is mounted, the assembly including a bearing which may be either recesses accommodating studs, or studs entering one recess. The plate, the pinion and the bearing are made in a single part and obtained by plastic flow, including in particular the forging and pressing of a sheet of material suited to cold flow.

However, the wheel concerned in this citation is a simple gear train including in a very conventional manner a plate provided with peripheral teeth in a more or less large number and a pinion mounted on said plate, this pinion having only a limited number of teeth (six in this case), these teeth being directed in the same direction as the teeth of the plate. Nothing in the aforecited document indicates or suggests that the method disclosed could also be used to manufacture a setting wheel of much finer texture, i.e. a wheel wherein the second toothing would be a contrate toothing including a significant number of teeth of much smaller dimensions than the dimensions of the simple clockwork pinion cited in the document.

This is how the cold flow method of steel suitable for stamping has been tried in order to obtain a time or date setting wheel having a more complicated structure than the structure of a simple wheel including only a plate and a pinion. To the surprise of the Applicant of the present invention, he has managed to produce, against all expectations, parts of excellent manufacture, the method in question thus revealing a surprising result which would have been difficult to imagine before.

In order to achieve this object, the method of the present invention includes the following steps:

providing a strip of steel suitable for stamping, cutting a circular ring in the strip, the inner diameter of such ring circumscribing a disc from which the wheel will be taken, said disc remaining attached to the strip by a plurality of bridges, applying onto one face of the disc a die perforated with a plurality of openings arranged in a circle and pressing onto the other face of the disc the flat face of a cylinder to cause the steel to flow inside the openings of the die to form the second series of teeth after which the die and cylinder are removed from the disc, cutting a hole at the centre of the disc, and retrieving the finished wheel by cutting the first series of teeth out of the disc, thereby separating said wheel from said strip.

Moreover, the invention also concerns a clockwork wheel, i.e. an hour or date setting wheel, manufactured according to the above method.

Figure 2:
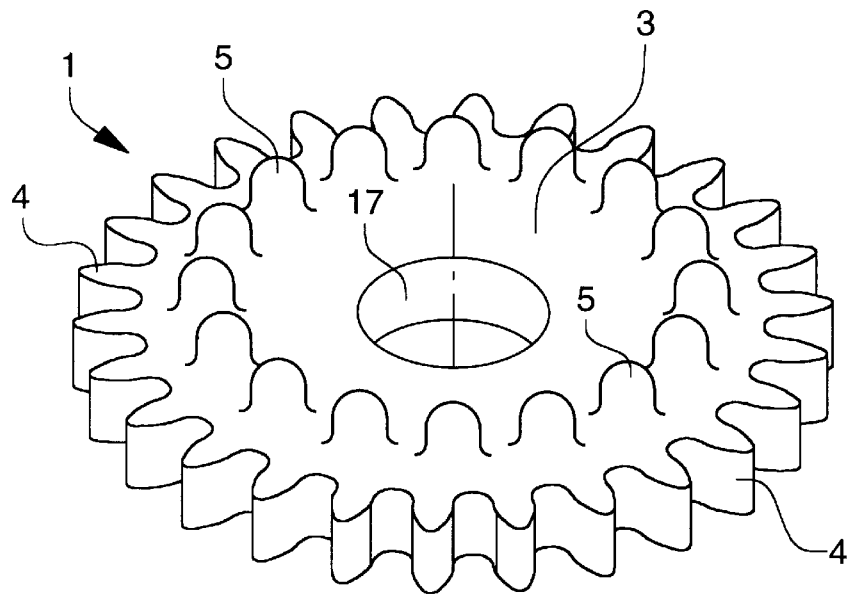
Figure 3:
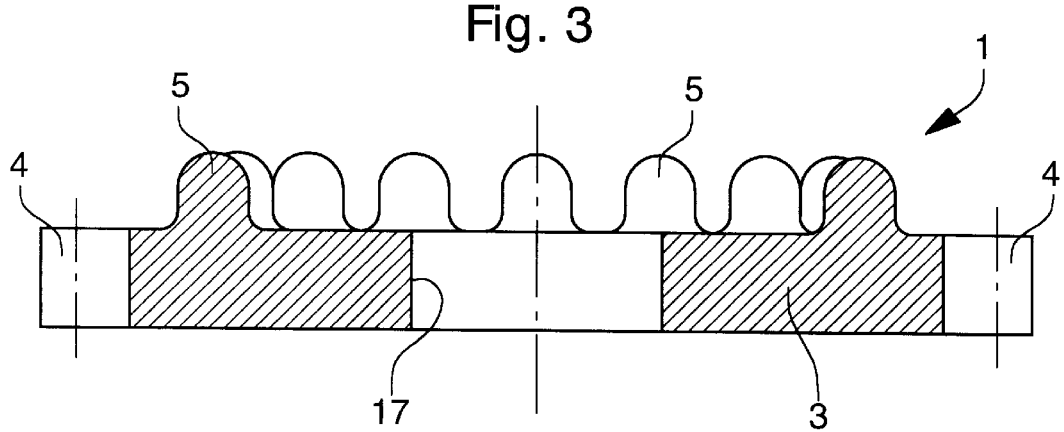
Figure 4:
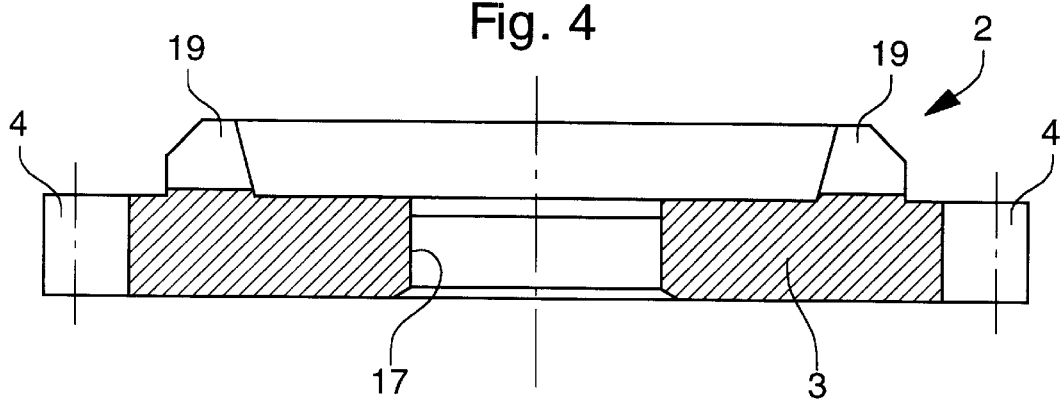

The advantages and significance of this method will now be explained in detail with reference to the following description and the drawings which illustrate it by way of non limiting example and in which:

FIG. 1 is a cross-section of a clockwork mechanism using the wheel manufactured according to the method of the invention, FIG. 2 is a perspective view of a first embodiment of the clockwork wheel manufactured according to the method of the invention, FIG. 3 is a cross-section of the wheel of FIG. 2, FIG. 4 is a cross-section of a second embodiment of the wheel manufactured according to the method of the invention, FIGS. 5 and 6, 7 and 8, 9 and 10, 11 and 12 illustrate respectively the first, second, third and fourth steps of the method for manufacturing a clockwork wheel according to the invention.

The clockwork mechanism shown in FIG. 1 is a time setting mechanism including a stem 20 able to slide into a plate 21 and having two locking positions, pushed in and pulled out, by a stem spring 22. This stem includes a pinion 23 meshing with a contrate toothing 5, 19 of a setting wheel 1, 2, this setting wheel and the manufacture thereof forming the subject of the present invention. Setting wheel 1, 2 includes a plate 3 provided with a first series of teeth 4 on the periphery thereof, and a second series of teeth 5, 19 arranged at right angles to plate 3. Setting wheel 1, 2 is meshed with a motion work (not shown in the drawing), this motion work driving on the one hand a cannon pinion 24 and on the other hand an hour wheel 25. Hour wheel 25 is attached to a pipe 26 onto which an hour hand (not shown) is fitted. Cannon wheel 24 bears the minute hand (not shown) and minute wheel 26 which is friction fitted thereto. FIG. 1 also shows a second wheel 27 attached to a shaft 28 onto which a second hand (not shown) is fitted. When, time setting stem 20 is rotated in the pulled out position, setting wheel 1, 2 is driven, which in turn via the motion work drives the minute and hour hands. During this operation, minute wheel 26 skids on cannon wheel 24, this wheel being held by the driving mechanism (not shown). It will also be mentioned that setting wheel 1, 2 includes a central hole 17 through which a stud 29, which is attached to plate 21, passes. Setting wheel 1, 2 is freely engaged on stud 29. Finally a motion work bridge 30 covers the time setting mechanism.

We now come to setting wheel 1, 2 itself and the manufacturing method thereof.

A first embodiment of setting wheel 1 is illustrated in FIGS. 2 and 3. As already stated, this setting wheel includes a plate 3 provided with a first series of teeth 4 surrounding the periphery thereof and a second series of teeth 5 arranged at right angles to plate 3, this second series of teeth being also called a contrate toothing. This first embodiment is characterized by a second series of cylindrical teeth 5 as is shown clearly in FIG. 3. The top of each tooth 5 is rounded, but could be flat as will be seen hereinafter.

A second embodiment of setting wheel 2 is illustrated in FIG. 4. The only difference with the first embodiment is that the contrate toothing has shaped teeth 19 which are cut in the conventional manner for this type of setting wheel. One will return to this second embodiment hereinafter.

The two embodiments described hereinbefore rely, according to the invention, upon a manufacturing method which includes the following series of steps, these steps being illustrated by FIGS. 5 to 12.

First of all a strip of steel suitable for stamping 6 is provided. To give an example, this strip, which is cold formed, has width of 16 mm and a thickness of 0.3 mm. It is fitted with three pilot holes perforated by a progressive forging die which will successively undertake all the manufacturing steps. The pilot holes allow the strip to be centred with accuracy between the various dies and punches which follow each other in the progressive forging die.

Figure 5:
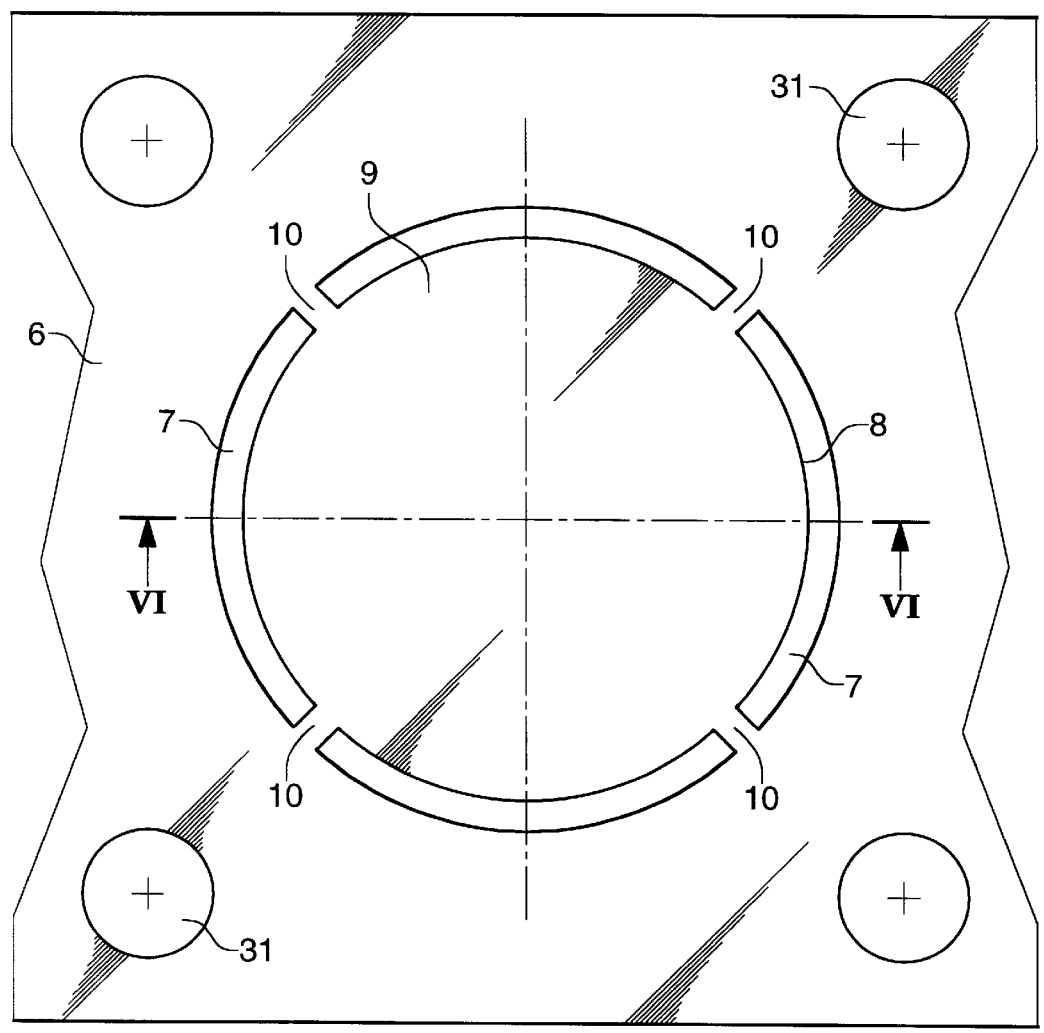
Figure 6:
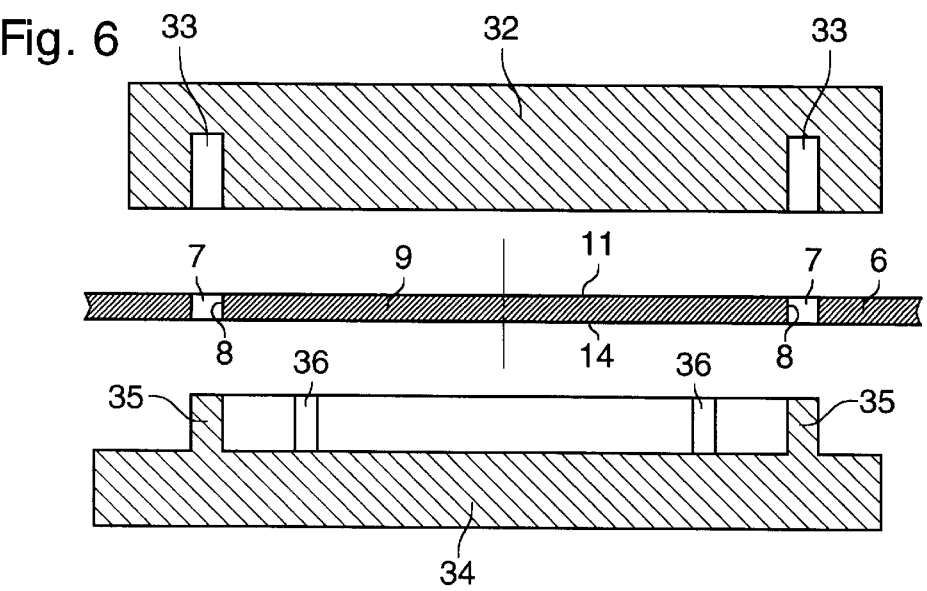

The first step is illustrated by FIGS. 5 and 6. Here, a circular ring 7 is cut in strip 6. The inner diameter 8 of this ring 7 circumscribes a disc 9 from which the desired clockwork wheel will be taken. As FIG. 5 shows, disc 9 remains attached to strip 6 by a certain number of bridges 10, i.e. four bridges 10 in the example shown in the Figure. The tools used for this operation are shown in cross-section in FIG. 6 which also shows strip 6 after ring 7 has been cut out, the cutting being made along the line VI—VI of FIG. 5. The cutting tool includes a die 32 pierced with four ring segments 33 and a punch 34 having four corresponding segments 35 interrupted by four bridges 36.

Figure 7:
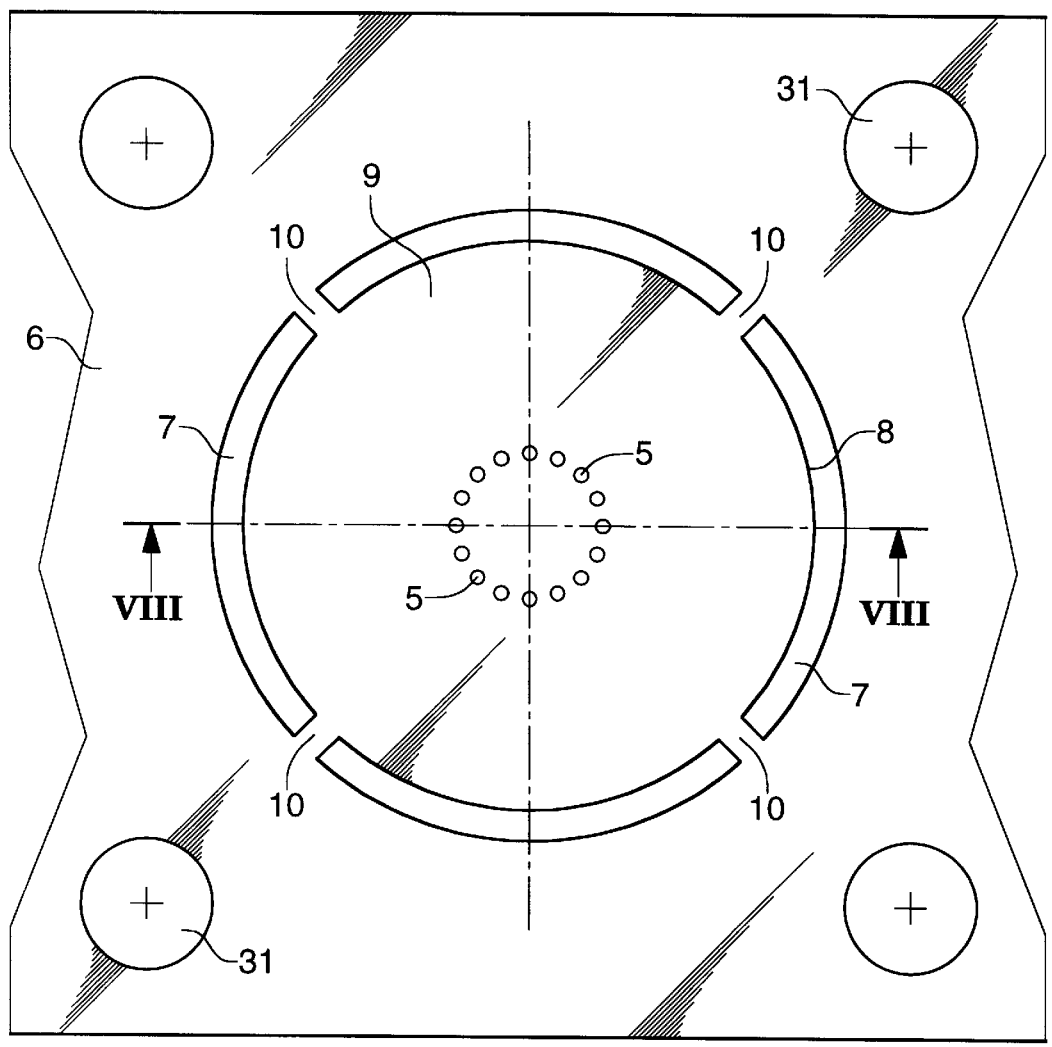
Figure 8:
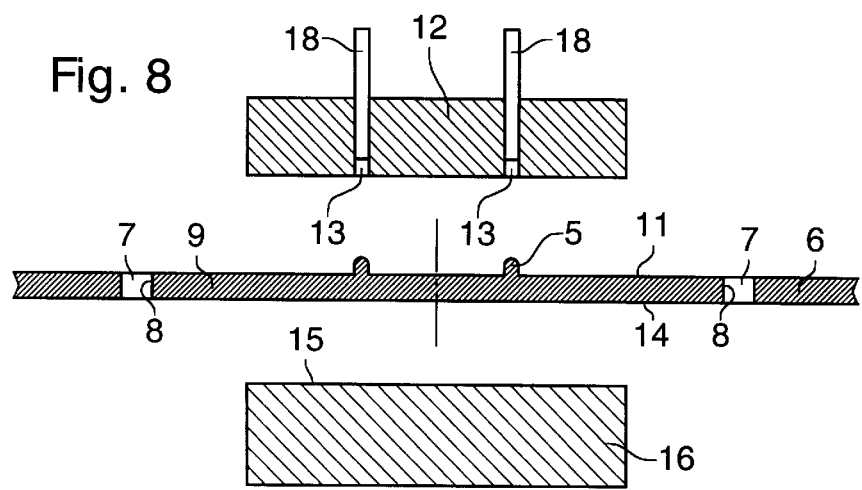

The second step is illustrated by FIGS. 7 and 8. As shown by FIG. 7, after this operation, disc 9 has a second series of teeth 5 arranged at right angles to said disc. The tools used for this second step are shown in cross-section in FIG. 8 which also shows strip 6 after flow, the cross-section being made along line VIII—VIII of FIG. 7, the flow operation occurring in the following manner. A die 12 perforated with a plurality of openings 13 is applied onto one face 11 of disc 9. The flat face 15 of a cylinder 16 is pressed onto the other face 14 of disc 9, to cause the steel suitable for stamping to flow inside openings 13 of die 12.

FIGS. 7 and 8, like the following Figures, show a second series of cylindrical teeth 5. In order to do this, die 12 is pierced with a plurality of cylindrical holes 13. This cylindrical tooth shape, however unconventional, allows a much softer transmission of movement than that obtained with teeth cut in the conventional manner. One thus obtains a harmonious movement which is distinguished by the absence of any scraping assuring greater comfort during the time setting operation. It will also be mentioned that the plurality of teeth 5 considered here has a very significant number of teeth bears which has nothing to do with the few teeth (five or six) of which a clockwork pinion is formed. Thus, as stated above, by a surprising and unexpected effect, the method described arrives at a large quantity of teeth, these teeth having moreover very small dimensions. In order to give an example, the second series of teeth 5 of the setting wheel described includes sixteen teeth whose cylinder diameter does not exceed 0.2 mm.

The height of teeth 5 can be controlled by the force with which cylinder 16 is pressed against face 14 of disc 9. In certain cases however, this height will be limited by arranging a pin 18 in each hole 13 of die 12. Whichever solution is chosen, the purpose of ring 7 cut in strip in the first step of the method will now be understood. Indeed, during compression, the material will flow not just into holes 13 of die 12 to form teeth 5, but also laterally in the longitudinal direction of strip 6. Ring 7, by arranging an empty space around disc 9, will thus make space for the excess material from this flow and thus allow more rigorous control of the formation of teeth 5. In the example cited and after compression, the thickness of the centre of the disc passes from 0.3 to 0.28 mm.

Die 12 is not limited to openings 13, arranged in a circle in the die, being of cylindrical configuration. These openings could in fact be shaped holes to form a second series of shaped teeth. These teeth would then be like those shown in FIG. 4 at reference 19. These teeth 19, which are also formed by material flow, have the same configuration as those conventionally obtained by cutting.

Figure 9:
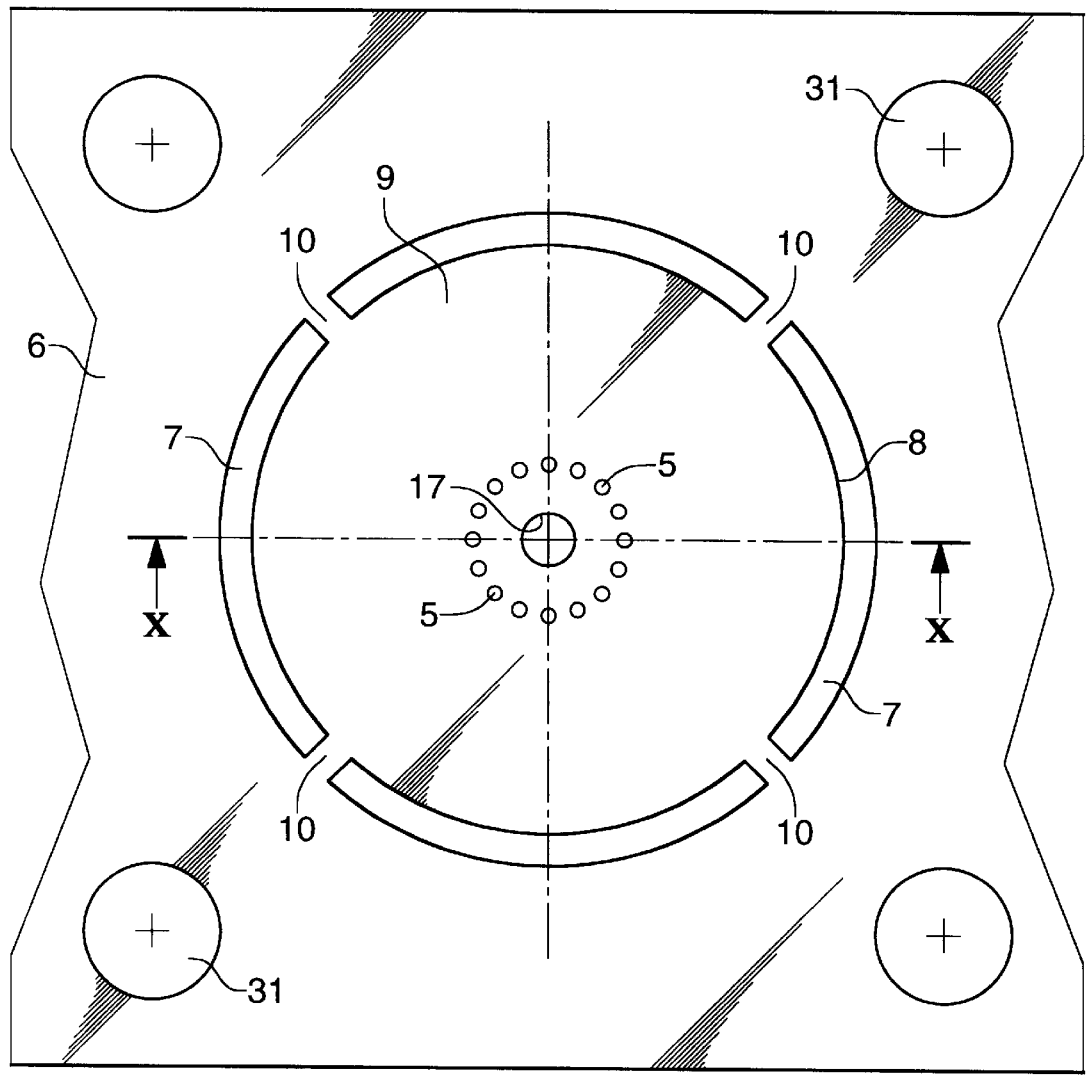
Figure 10:
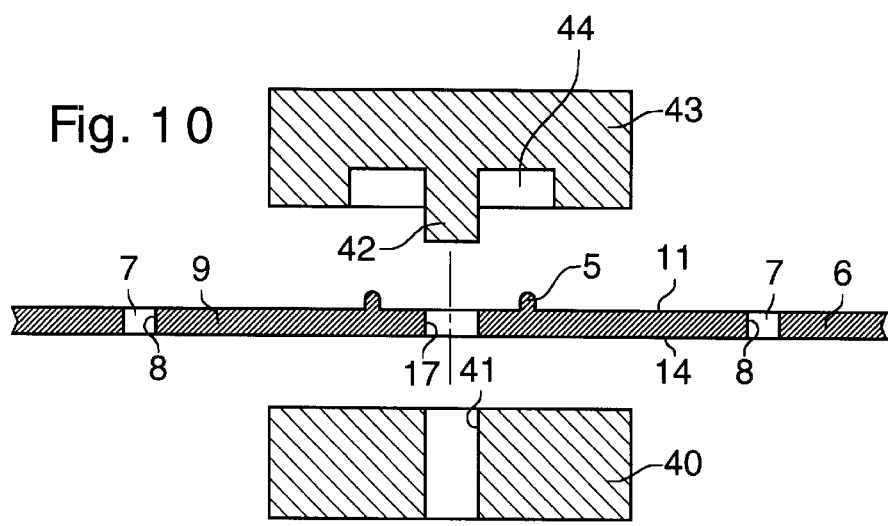

The third step is illustrated by FIGS. 9 and 10. As FIG. 9 shows, disc 9 has a hole 17 cut into its centre. This hole 17 is used, as is seen in FIG. 1, to fix setting wheel 1, 2 so as to rotate freely on stud 29 of plate 21. The tools used for this operation are shown in cross-section in FIG. 10 which also shows strip 6 after hole 17 has been cut, the cutting being made along line X—X of FIG. 9. The cutting tool includes a die 40 pierced with a hole 41 and a punch 42 cut into a block 43. Hole 41, and punch 42 are dimensioned to cut hole 17 of disc 9. Block 43 is provided with an annular opening 44 to leave space for the teeth during the cutting operation.

Figure 11:
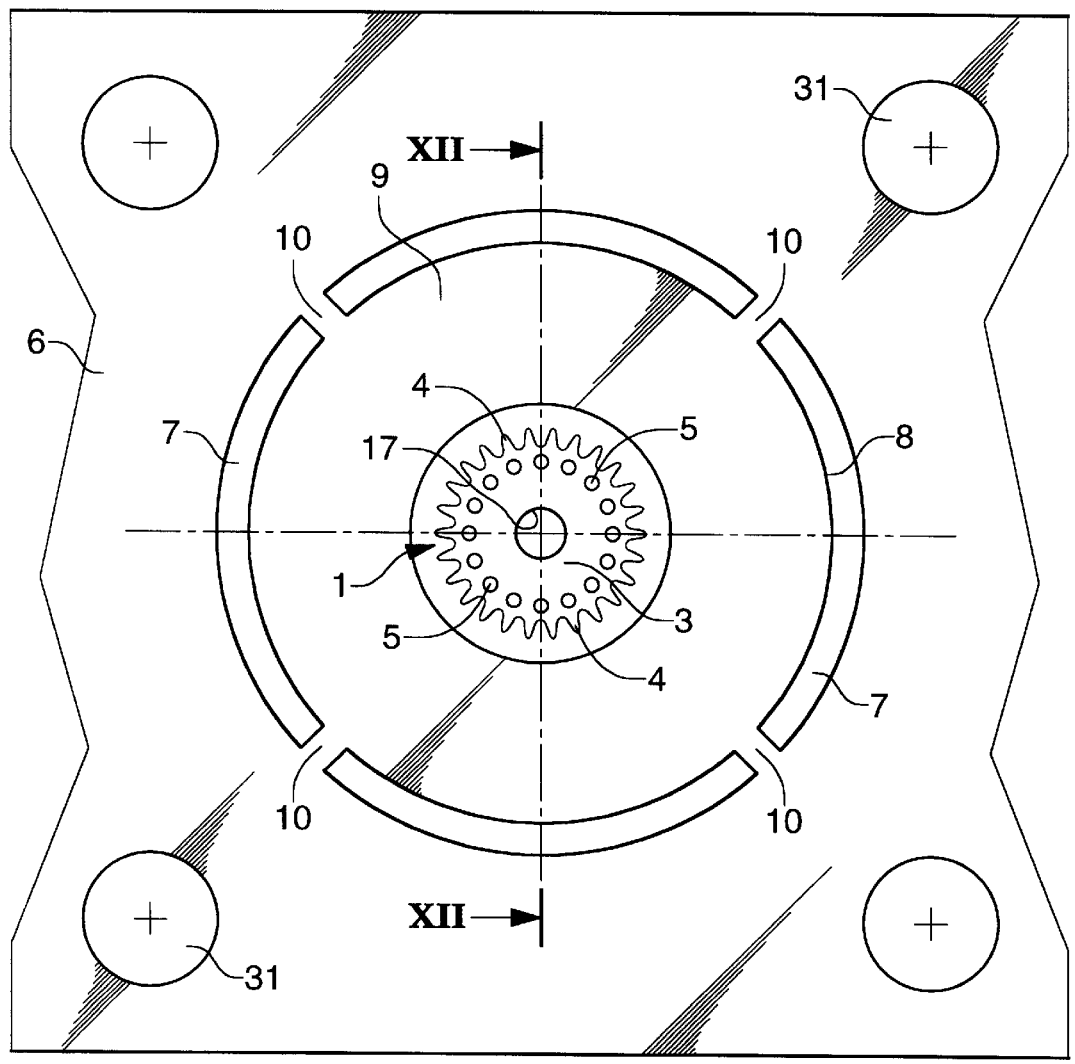
Figure 12:
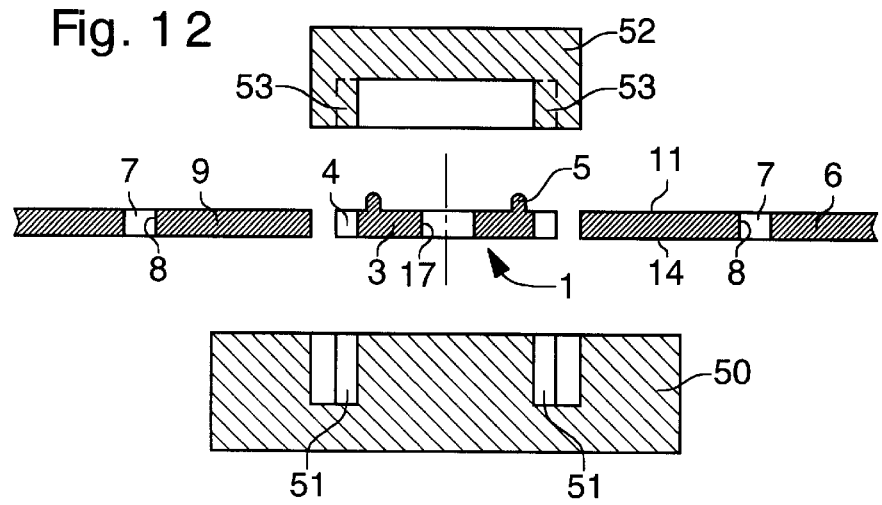

The fourth step is illustrated in FIGS. 11 and 12. During this fourth and last step, finished wheel 1 is retrieved. In order to do this, as seen in FIG. 11, the first series of teeth 4 is cut in disc 9, this cutting quite naturally causing the separation of the wheel from strip 6. The tools used for this latter operation are shown in cross-section in FIG. 12 which also shows strip 6 and wheel 1 after this wheel has been cut out, the cutting being made along the line XII—XII of FIG. 11. The cutting tool includes a die 50 in which are cut the teeth 51 which have to be reproduced in the wheel and a punch 52 having corresponding teeth 53. As is shown clearly in FIG. 12, when the cutting is finished, wheel 1 is provided with its peripheral toothing 4 at the same time that it is separated from disc 9. To take again the example of the wheel cited above with respect to the second step and which includes sixteen contrate teeth 5, this wheel, after the cutting described in the fourth step, includes twenty-six peripheral teeth 4.

One will touch upon the elegance of the method proposed here since, whether contrate teeth 5 are cylindrical or shaped, it advantageously replaces the usual machining method which consists in producing a blank of the setting wheel, then a first cutting operation of the peripheral teeth of the plate followed by second cutting operation of the contrate teeth. The method using material flow is thus cheaper especially because of the saving of time required for making the setting wheel.

As mentioned hereinbefore, the method described is used for manufacturing a setting wheel, this wheel including on the same plate a peripheral toothing and a contrate toothing. Said wheel is used either in a time setting mechanism as shown in FIG. 1, or in a date setting mechanism for a date indicator.

What is claimed is:

1. A method for manufacturing a clockwork wheel including a plate provided with a first series of teeth on the periphery thereof and a second series of teeth arranged at right angles to the plate, this method including the following series of steps:

providing a strip of steel suitable for stamping, cutting a circular ring in the strip, the inner diameter of such ring circumscribing a disc from which the wheel will be taken, said disc remaining attached to the strip by a plurality of bridges, applying onto one face of the disc a die perforated with a plurality of openings arranged in a circle, and pressing onto the other face of the disc the flat face of a cylinder to cause the steel to flow inside the openings of the die to form the second series of teeth after which the die and cylinder are removed from the disc, cutting a hole at the centre of the disc, and retrieving the finished wheel by cutting the first series of teeth out of the disc, thereby separating said wheel from said strip.

2. A method according to claim 1, wherein the openings arranged in a circle in the die are cylindrical holes to form a second series of cylindrical teeth.

3. A method according to claim 2, wherein each cylindrical hole is obturated by a pin the depth of the hole defining the height of the teeth.

4. A method according to claim 1, wherein the openings arranged in a circle in the die are shaped holes to form a second series of shaped teeth.

5. A method according to claim 1, wherein the clockwork wheel is a time setting wheel.

6. A method according to claim 1, wherein the clockwork wheel is a date setting wheel.

* * * * *